(12) United States Patent
Scheerle et al.

(10) Patent No.: US 10,002,525 B2
(45) Date of Patent: Jun. 19, 2018

(54) METHOD AND DEVICE FOR THE REMOTE CONTROL OF A FUNCTION OF A VEHICLE

(71) Applicant: Daimler AG, Stuttgart (DE)

(72) Inventors: Marc Scheerle, Kusterdingen (DE); Holger Schoepges, Hattenhofen (DE)

(73) Assignee: Daimler AG, Stuttgart (DE)

( * ) Notice: Subject to any disclaimer, the term of this patent is extended or adjusted under 35 U.S.C. 154(b) by 212 days.

(21) Appl. No.: 14/900,997

(22) PCT Filed: Jun. 20, 2014

(86) PCT No.: PCT/EP2014/001679
§ 371 (c)(1),
(2) Date: Dec. 22, 2015

(87) PCT Pub. No.: WO2014/206543
PCT Pub. Date: Dec. 31, 2014

(65) Prior Publication Data
US 2017/0186310 A1    Jun. 29, 2017

(30) Foreign Application Priority Data
Jun. 28, 2013   (DE) .......................... 10 2013 010 819

(51) Int. Cl.
*G05B 11/01* (2006.01)
*G08C 17/02* (2006.01)
*B60R 16/023* (2006.01)

(52) U.S. Cl.
CPC ............ *G08C 17/02* (2013.01); *B60R 16/023* (2013.01); *G08C 2201/93* (2013.01)

(58) Field of Classification Search
CPC .... G08C 17/02; G08C 2201/93; B60R 16/023
See application file for complete search history.

(56) References Cited

U.S. PATENT DOCUMENTS

2005/0170818 A1* 8/2005 Netanel ................. G06Q 20/32
                                                            455/415
2006/0001770 A1* 1/2006 Kang ................. G07C 9/00944
                                                            348/552

(Continued)

FOREIGN PATENT DOCUMENTS

DE    10 2009 051 463 A1    5/2011
DE    10 2012 001 583 A1    1/2013

(Continued)

OTHER PUBLICATIONS

PCT/EP2014/001679, International Search Report (PCT/ISA/220 and PCT/ISA/210) dated Sep. 24, 2014, with partial English translation, enclosing Written Opinion of the International Searching Authority (PCT/ISA/237) (Eleven (11) pages).

(Continued)

*Primary Examiner* — Ryan Sherwin
(74) *Attorney, Agent, or Firm* — Crowell & Moring LLP

(57) ABSTRACT

A method and device for the remote control of a function of a vehicle is disclosed. Images of the vehicle are recorded by a camera which is integrated in the mobile control unit. A visual signal is generated at a predetermined position on the vehicle, where remote control is only enabled if the visual signal is recorded by the camera. The device for the remote control of a function of a vehicle includes a mobile control unit with an integrated camera to record the images of the vehicle. A signal generation unit is arranged at a predetermined position on the vehicle for the generation of a visual signal and the vehicle includes a function unit for the control of the function. The function unit is formed in such a way that remote control is only enabled when the visual signal is recorded by the camera.

10 Claims, 3 Drawing Sheets

(56) References Cited

U.S. PATENT DOCUMENTS

2009/0091477 A1* 4/2009 Mc Call ................. G01S 19/42
340/990
2010/0198428 A1* 8/2010 Sultan ................ G07C 9/00309
701/2

FOREIGN PATENT DOCUMENTS

| JP | 2002-315078 A | 10/2002 |
| JP | 2004-107959 A | 4/2004 |
| JP | 2007-265288 A | 10/2007 |
| JP | 2008-15839 A | 1/2008 |

OTHER PUBLICATIONS

German Office Action issued in counterpart application No. DE 10 2013 010 819.5 dated May 7, 2014 (Six (6) pages).
Japanese Notification of Reason for Refusal issued in Japanese counterpart application No. 2016-522310 dated Dec. 20, 2016, with partial English translation (Five (5) pages).

* cited by examiner

METHOD AND DEVICE FOR THE REMOTE CONTROL OF A FUNCTION OF A VEHICLE

BACKGROUND AND SUMMARY OF THE INVENTION

The invention relates to a method for the remote control of a function of a vehicle, wherein a signal generated by the vehicle is recorded by means of a signal receiving unit which is integrated in the mobile control unit.

The invention furthermore relates to a device for the remote control of a function of a vehicle, wherein a mobile control unit includes an integrated signal receiving unit to record the signal of the vehicle.

A method and a system for the control, monitoring and configuration of a network-compatible arrangement formed as a motor vehicle having at least one functional element are known from DE 10 2012 001 583 A1, the functional element having at least two function states. The method is carried out by means of a control device which is mobile, network-compatible and formed as a mobile telephone, wherein the control unit has a display and a camera. As such, the arrangement and the control device form a network connection and the control device takes a camera image of the at least one functional element by means of the camera. Furthermore, the functional element is detected and at least one selection from the at least two function states of the functional element is established, wherein the display of the control device shows the camera image which was taken and additionally at least the selection from the at least two function states of the functional element is determined, such that an operator of the control device can select at least one function state of the functional element. The function state selected by the operator is transmitted by the control device via the network to the arrangement and the functional element is brought into the function state selected by the operator. Furthermore, DE 10 2012 001 583 A1 describes a computer program product for carrying out the method.

The object of the invention is to specify an improved method compared to the prior art and an improved device for the remote control of a function of a vehicle.

In a method for the remote control of a function of a vehicle, signals of the vehicle are recorded by means of a signal receiving unit integrated in the control unit. According to the invention, a visual or audible signal is generated at a predetermined position on the vehicle, wherein remote control is only enabled if the visual or audible signal is recorded by the signal receiving unit. The signal receiving unit can be a camera or microphone integrated in the mobile control unit. In a particularly advantageous manner, the method according to the invention only enables remote control to take place if the mobile control unit, i.e., in particular the camera thereof, is focused on the vehicle. The mobile control unit can therefore be used in a particularly advantageous manner as a so-called dead man's switch, wherein, due to the camera being focused on the vehicle, the user's view is focused on this. In a particularly advantageous manner, the method according to the invention therefore also enables the execution of autonomous driving processes, for example autonomous parking processes, of the vehicle, which are automatically interrupted in the case of the user turning their eyes away from the vehicle and consequential changes to the focus of the camera on positions deviating from the vehicle.

In one possible development of the method, coded information is emitted by means of the visual or audible signal. This emission means that the visual or audible signals can only be detected by an authorized mobile control unit.

According to one embodiment, the coded information is recorded by means of the signal receiving unit and processed by means of the mobile control unit and enhanced by a key code to an authorization signal, wherein the authorization signal is transmitted to the vehicle via a data connection established between the mobile control unit and the vehicle. It can thereby be detected by the vehicle that the relevant mobile control unit has an authorization for the remote control of the function.

According to a further embodiment, remote control is only enabled if the authorization signal is recorded by the vehicle and is recognized as being valid. It is therefore impossible for remote control to be carried out by means of a mobile control unit which does not have valid authorization.

Alternatively, remote control is enabled for a predetermined period after recording an authorization signal which is detected and recorded by the vehicle as being valid. Since approval is limited in time and authorization must be renewed at intervals by the relevant mobile control unit, the danger of authorization remote control, for example by so-called hackers, is reduced.

In one possible development, the images of the vehicle recorded by means of the camera are displayed by means of a visual display unit which is integrated in the mobile control unit. The user is therefore able to have the vehicle in sight and direct the camera, as required, towards the vehicle at the same time in a simple manner.

According to one embodiment, the visual signal is emitted as a light signal by means of at least one light unit of the vehicle. The light signal is, for example, a light signal in the range which is visible to the human eye. In an advantageous manner, light units already located on the vehicle, for example headlights, rear lights, direction indicators and/or marking lights, can therefore be used for the generation of the light signal, such that material costs to execute the method are minimized. Alternatively, the light signal can also be a signal in the range which is not visible to the human eye.

The device for the remote control of a function of a vehicle includes a mobile control unit which includes an integrated signal receiving unit for the recording of signals of the vehicle. According to the invention, a signal generation unit for the generation of a signal is arranged at at least one predetermined position on the vehicle and the vehicle includes a function unit for the control of a function, wherein the function unit is formed in such a way that remote control is only enabled in the case of the signal being recorded by means of the signal receiving unit. In a particularly advantageous manner, the device according to the invention also only enables remote control to take place if the mobile control unit, i.e., in particular the camera thereof, is focused on the vehicle. The mobile control unit thereby forms a dead man's switch in the device in a particularly advantageous manner, wherein, due to the camera being focused on the vehicle, the user's view is focused on this. As a result, autonomous driving processes, for example autonomous parking processes, of the vehicle can be carried out by means of the device, the driving processes being able to be automatically interrupted in the case of the user turning their eyes away from the vehicle and consequential changes to the focus of the camera on positions deviating from the vehicle.

In one possible embodiment of the device, a data connection is formed between the mobile control unit and the vehicle for the transmission of an authorization signal from the mobile control unit to the function unit. The authorization signal can be transmitted via this data connection in a simple, secure and fast manner.

In a further possible embodiment, the mobile control unit is a mobile telephone. Since conventional mobile telephones already have at least one camera or microphone and means to establish a suitable data connection, the use of mobile telephones as mobile control units further reduces the costs and material requirements. The only requirement for data processing is an application program, which, for example, can be transmitted in the form of a so-called app to the mobile telephone. Furthermore, the use of mobile telephones as mobile control units, due to the fact that these are carried around by people in most cases anyway, is characterized in that the user does not have to carry around an additional device for the remote control of the function.

Exemplary embodiments of the invention are illustrated in greater detail below by means of drawings.

DETAILED DESCRIPTION OF THE DRAWINGS

Figure 1:
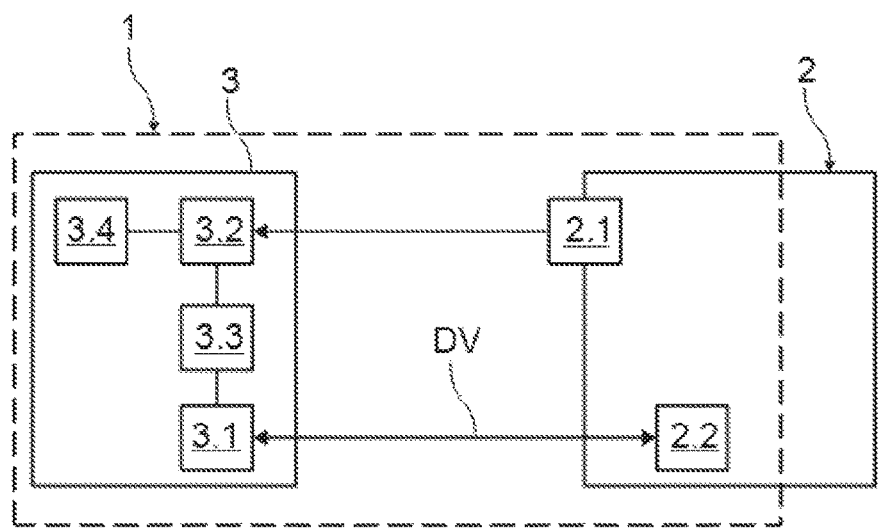
FIG. 1 schematically, is a block diagram of a device according to the invention,
FIG. 2 schematically, is a flow diagram of a method according to the invention,
FIG. 3 schematically, is a first perspective presentation of a vehicle and a mobile control unit, and
FIG. 4 schematically, is a second perspective presentation of a vehicle and a mobile control unit according to FIG. 2.

Parts that correspond to one another are provided with the same reference numerals in all figures.

In FIG. 1 a block diagram of a possible exemplary embodiment of the device 1 according to the invention and of a vehicle 2 is presented.

The device 1 is provided for the remote control of at least one function of the vehicle 2 and includes a mobile control unit 3 for this purpose. An autonomous parking process is described below in an exemplary manner as a function which can be controlled remotely. In contrast, alternatively or additionally, further functions of the vehicle 2 can be controlled remotely, for example deviating autonomous driving processes, autonomous processes involving leaving parking spaces, light functions, opening and closing vehicle doors and/or of a locking system, air conditioning and ventilation and further comfort functions of the vehicle 2.

During the remote control of the autonomous parking process, the user, in particular a driver of the vehicle 2, finds himself or herself outside the vehicle 2. A mobile telephone, for example a so-called smart phone, is used as a mobile control unit 3, which has a transmission/receiving unit 3.1 to establish a wireless data connection DV. In particular, the data connection DV is a radio connection, such as, for example, a so-called Bluetooth or WLAN connection or a connection to near-field communication. Furthermore, the mobile control unit 3 includes a signal receiving unit 3.2, for example a camera or a microphone for the generation of visual or audible signals of the vehicle 2.

During the remote control of the autonomous parking process, a closed communication chain is established between the vehicle 2 and the mobile control unit 3, by means of which the vehicle 2 is clearly identified and incorrect and external operation is prevented.

For this purpose, a visual light signal which is visible to the human eye is generated starting from a signal generation unit 2.1 arranged on the vehicle 2 which is formed as a light unit, for example as headlights, rear lights, direction indicators and/or marking lights. Coded information is thereby emitted by means of the visual light signal, wherein the visual light signal is recorded by means of the camera 3.2. Alternatively, the light signal can also be a signal situated in the range which is not visible to the human eye, for example the infrared range, which is generated with a suitable source.

The visual and audible signals recorded by means of the signal receiving unit 3.2 are evaluated by means of a data processing unit 3.3 of the mobile control unit 3 and the coded information from the visual or audible signals is decoded. For this purpose, the mobile control unit 3 includes an application program for data processing, which, for example, can be transmitted in the form of a so-called app to the mobile control unit 3. Finally, the coded information is enhanced by a key code to an authorization signal, which is transmitted via the data connection DV established between the mobile control unit 3 and the vehicle 2 to a function unit 2.2 for the control of the parking function.

The authorization signal recorded by the function unit 2.2 is checked by means of this for its validity and authenticity. The remote control of the parking function is only enabled by means of the function unit 2.2 if the authorization signal is recorded and detected as being valid. It is therefore ensured that remote control by the user is monitored. The remote control of the parking function is only carried out when this communication chain is closed. If the user changes the focus of the signal receiving unit 3.2 of the mobile control unit 3 in such a way that the visual or audible signals are no longer received, remote control is stopped. The mobile control unit thereby forms a so-called dead man's switch, by means of which the user can supervise the function to be controlled remotely and can intervene in the case of malfunction in a particularly simple manner.

In order to make focusing the camera 3.2 easier for the user, the images of the vehicle 2 recorded by the camera 3.2 are displayed by means of a display unit 3.4 which is integrated in the mobile control unit 3. This integrated display unit can be visual as well as being in the form of a loudspeaker of the mobile control unit 3. As long as the vehicle or the visual signal of the vehicle is recorded by the camera 3.2, a visual or audible indication is emitted.

As a result, the approval for remote control is only given if the visual or audible light signal is recorded by the signal receiving unit 3.2 and the vehicle 2 receives a valid authorization signal from the mobile control unit.

As such, it is required that the mobile control unit 3 comprise access and driving authorization for the vehicle 2 and that the transmitter/receiving unit 3.1 of the mobile control unit 3 as well as a transmitter/receiving unit of the function unit which is not presented can be clearly identified. These therefore comprise clear names, wherein the data connection DV between the mobile control unit 3 and the vehicle 2 is firstly established to implement remote control. This means that the mobile control unit 3 and the vehicle 2 are "paired".

In one possible embodiment, remote control is enabled for a predetermined period after recording an authorization signal which is detected and recorded by the vehicle as being valid.

Alternatively or additionally, it is also possible that audible signals are emitted by means of the vehicle 2, the signals being recorded by a microphone of the mobile control unit 3 and evaluated by means of the mobile control unit 3 and enhanced by a key code to an authorization signal.

Figure 2:
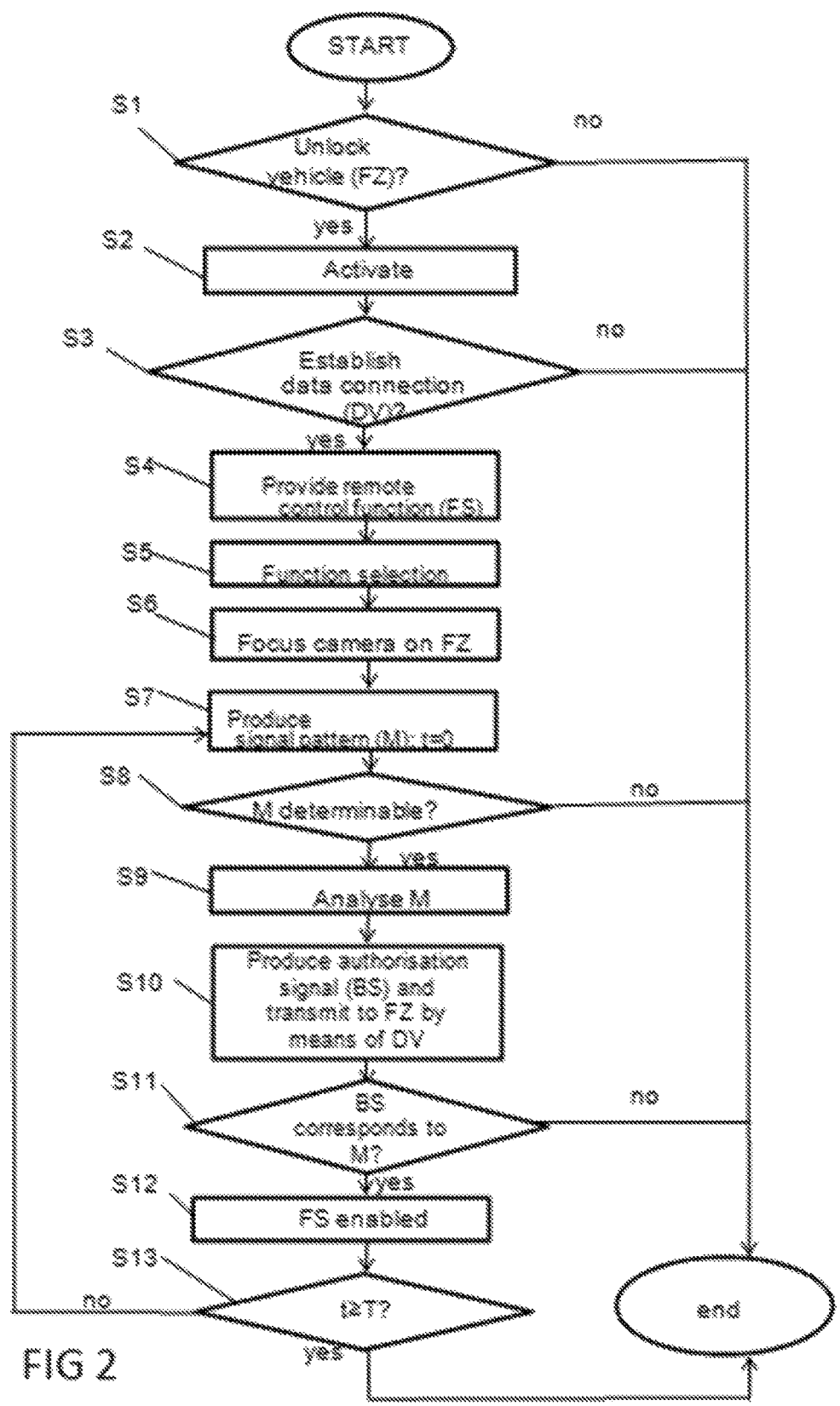

FIG. 2 shows a flow diagram of a possible exemplary embodiment of the method according to the invention for the remote control of the parking function of the vehicle 2. On this occasion, the data connection DV is established by means of a Bluetooth wireless connection and a visual light signal in the visible range is generated by the signal generation unit 2.1.

The following requirements must be fulfilled in order to execute this exemplary embodiment of the method. The function unit 2.2 includes an electronic control device, which enables pairing and data communication between the mobile control unit 3 and the vehicle 2. The mobile control unit 3 includes the application program which is suitable for data processing.

In a first method step S1, the vehicle 2 is unlocked by the user, which, for example, can also be carried out by means of the mobile control unit 3.

In a second method step S2, the application program on the mobile control unit 3 is started.

In a third method step S3, the mobile control unit 3 makes contact with the vehicle 2, i.e., with the electronic control device of the function unit 2.2, via the data connection DV. If the data connection DV is verified by the vehicle 2, i.e., by the electronic control device of the function unit 2.2, then in a fourth method step S4 following this, by means of the application program, the user of the mobile control unit 3 is offered the remote control function (FS) for a parking process or a selection of different remote control functions, from which they are able to choose.

Method steps S1 to S4 therefore serve for the preparation of a connection establishment and thereby the establishment of the data connection DV of the mobile control unit 3 with the vehicle 2, i.e., with the electronic control device of the function unit 2.2.

In a fifth method step S5, the user selects the desired remote control function on the mobile control unit 3. In a sixth method step S6, the user is thereby requested to focus the signal receiving unit 3.2, for example the camera of the mobile control unit 3, on the vehicle 2.

In a seventh method step S7, the visual light signal is generated as a rhythmic light signal by means of the signal generation unit 2.1. Here, the described exemplary embodiment is a signal pattern M which is generated by means of a direction indicator of the vehicle 2 shown in more detail in FIGS. 3 and 4, which is formed, for example, randomly, but not regularly with a minimum variance and minimum character lengths, which allow the required monitoring in the time interval.

In an eighth method step S8, the generated visual signal pattern M is recorded by means of the camera 3.2 of the mobile control unit 3. For this purpose, a visual indication, for example by means of the display unit 3.4, or an audible indication by means of a loud speaker of the mobile control unit 3 which is not shown, is emitted to the user.

If the user focuses the camera 3.2 of the mobile control unit 3, for example, on the floor, such that the direction indicator of the vehicle 2 lies outside the detection region of the camera 3.2, no signal pattern M can be detected by means of the camera 3.2. The process is then terminated and the remote control function cannot be executed.

In a ninth method step S9, the received signal is evaluated by means of the application program of the data processing unit 3.3 of the mobile control unit 3. In the process, coded information is decoded from the light signal.

Finally, in a tenth method step S10, the coded information is enhanced by the key code to the authorization signal (BS) which is transmitted via the data connection DV established between the mobile control unit and the vehicle, i.e., in the described exemplary embodiment via the Bluetooth connection, to the function unit 2.2 for the control of the parking function.

In an eleventh method step S11, the authorization signal (BS) is evaluated by means of the electronic control device of the function unit 2.2 of the vehicle 2, wherein, during the evaluation, in particular a comparison between the transmitted signal pattern M and the received signal pattern takes place.

If the authorization signal is detected as being valid by the control device of the function unit 2.2, in the twelfth method step S12, this confirms that the communication chain between the vehicle 2 and the mobile control unit 3 is closed and enables the remote control function.

In a thirteenth method step S13, it is checked whether or not the time between the generation of the signal pattern M in method step S7 and approval of the remote control function S12 exceeds a time interval T which is suitable for monitoring, which, for example, is 100 ms. As long as this time interval T is not exceeded, method steps S7 to S12 are repeated. If this time T is exceeded, the remote control function is ended.

Figure 3:
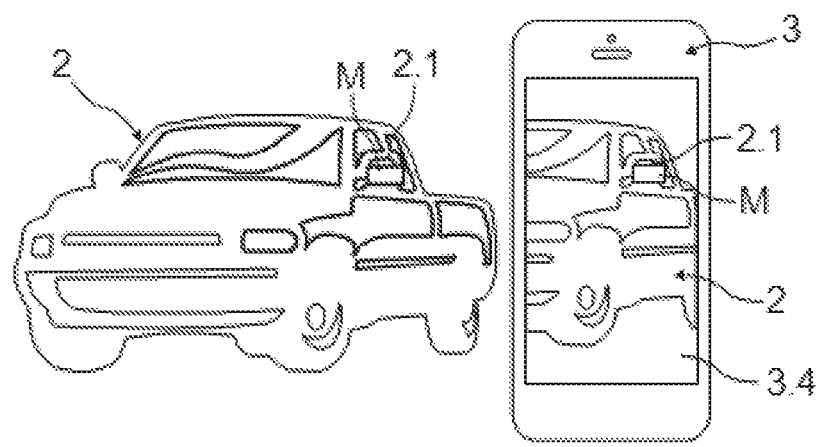

In FIG. 3, a first perspective presentation of the vehicle 2 and the mobile control unit 3 formed as a mobile telephone is presented, wherein the signal pattern M generated by means of the direction indicator of the vehicle 2 lies in the detection region of the camera 3.2 and the communication chain between the vehicle 2 and the mobile control unit 3 is closed. As a result, the remote control function is enabled.

The images recorded by means of the camera 3.2 are presented by means of the display unit 3.4.

Figure 4:
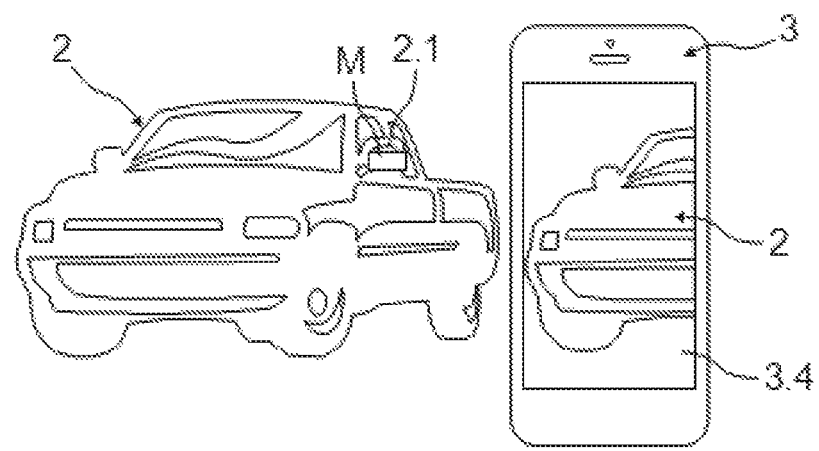

FIG. 4 shows a second perspective presentation of the vehicle 2 and the mobile control unit 3 formed as a mobile telephone, wherein the signal pattern M generated by means of the direction indicator of the vehicle 2 lies outside the detection region of the camera 3.2, since the camera 3.2 is not correctly focused on the vehicle 2. The communication chain between the vehicle 2 and the mobile control unit 3 is therefore interrupted. As a result, the remote control function is disabled.

The images recorded by means of the camera 3.2 are presented by means of the display unit 3.4. In a manner which is not presented in more detail, a visual and/or audible indicator can be emitted to the user such that the communication chain between the vehicle 2 and the mobile control unit 3 is interrupted and an alignment of the camera 3.2 of the mobile control unit 3 towards the vehicle 2, in particular the respective signal generation unit 2.1, is required in order to enable the remote control function.

The invention claimed is:

1. A method for the remote control of a function of a vehicle, comprising the steps of:
   generating a visual signal or an audible signal at a predetermined position on the vehicle; and
   enabling the remote control only if the visual signal or the audible signal is recorded by a signal receiving unit which is integrated in a mobile control unit.

2. The method according to claim 1, wherein coded information is emitted by the visual signal or the audible signal.

3. The method according to claim 2, wherein the coded information is recorded by the signal receiving unit and processed by the mobile control unit and enhanced by a key code to an authorization signal, wherein the authorization signal is transmitted to the vehicle via a data connection established between the mobile control unit and the vehicle.

4. The method according to claim 3, wherein the remote control is only enabled if the authorization signal is recorded by the vehicle and is detected as being valid.

5. The method according to claim 1, wherein the remote control is enabled for a predetermined period after recording an authorization signal which is detected and recorded by the vehicle as being valid.

6. The method according to claim 1, wherein images of the vehicle recorded by a camera are displayed by a visual display unit which is integrated in the mobile control unit.

7. The method according to claim 1, wherein the visual signal is emitted as a light signal by a light unit of the vehicle.

8. A device for the remote control of a function of a vehicle, comprising:
a mobile control unit that includes an integrated signal receiving unit for recording of signals of the vehicle; and
a signal generator which is disposed at a predetermined position on the vehicle for generation of a visual signal or an audible signal;
wherein the remote control of the function of the vehicle is only enabled if the visual signal or the audible signal is recorded by the signal receiving unit.

9. The device according to claim 8, wherein a data connection is formed between the mobile control unit and the vehicle and wherein an authorization signal is transmittable over the data connection from the mobile control unit to the vehicle.

10. The device according to claim 8, wherein the signal receiving unit is a camera or a microphone.

* * * * *